US012675687B2

(12) United States Patent
Alabdulmohsin et al.

(10) Patent No.: US 12,675,687 B2
(45) Date of Patent: Jul. 7, 2026

(54) TRAINING NEURAL NETWORKS WITH REINITIALIZATION

(71) Applicant: Google LLC, Mountain View, CA (US)

(72) Inventors: Ibrahim Alabdulmohsin, Cham (CH); Hartmut Maennel, Zurich (CH); Daniel M. Keysers, Stallikon (CH)

(73) Assignee: Google LLC, Mountain View, CA (US)

( * ) Notice: Subject to any disclaimer, the term of this patent is extended or adjusted under 35 U.S.C. 154(b) by 1232 days.

(21) Appl. No.: 17/560,118

(22) Filed: Dec. 22, 2021

(65) Prior Publication Data

US 2022/0253694 A1     Aug. 11, 2022

Related U.S. Application Data

(60) Provisional application No. 63/146,387, filed on Feb. 5, 2021.

(51) Int. Cl.
*G06N 3/08* (2023.01)
*G06N 3/04* (2023.01)

(52) U.S. Cl.
CPC ................ *G06N 3/08* (2013.01); *G06N 3/04* (2013.01)

(58) Field of Classification Search
CPC ..................................................... G06N 3/08
See application file for complete search history.

(56) References Cited

U.S. PATENT DOCUMENTS

2020/0302299 A1*  9/2020  Nagel ...................... G06N 3/08
2021/0019599 A1*  1/2021  Mazzawi ................. G06N 3/08

OTHER PUBLICATIONS

"Performance analysis of neural network with improved weight training process", https://ieeexplore.ieee.org/document/8729535, Yifeng Zhao, Jun. 6, 2019, IEEE, p. 1760 (Year: 2019).*
Abadi et al., "TensorFlow: Large-scale machine learning on heterogeneous distributed systems," Nov. 9, 2015, 19 pages.
Arora et al., "Stronger generalization bounds for deep nets via a compression approach," Presented at International Conference on Machine Learning, Stockholm, Sweden, Jul. 10-15, 2018, 10 pages.
Arpit et al., "A closer look at memorization in deep networks," Proceedings of the 34th International Conference on Machine Learning, Aug. 2017, 10 pages.
Ba et al., "Layer normalization," arXiv, Jul. 21, 2016, 14 pages.
(Continued)

*Primary Examiner* — Alexey Shmatov
(74) *Attorney, Agent, or Firm* — Fish & Richardson P.C.

(57) ABSTRACT
Methods, systems, and apparatus, including computer programs encoded on computer storage media, for training a neural network using re-initialization. One of the methods includes, at each time step in a sequence of time steps: identifying current values of the weights as of the training time step; selecting one of the layer blocks; generating new values for the weights of the plurality of neural network layers, comprising: re-initializing the values of the weights of at least the neural network layers in the layer blocks that are after the selected layer block without re-initializing the current values of the weights of the neural network layers in the layer block and the neural network layers in any layer block that is before the selected layer block; and raining the neural network starting from the new values for the weights of the plurality of neural network layers.

18 Claims, 3 Drawing Sheets

300

310

(56) References Cited

OTHER PUBLICATIONS

Bartlett et al., "Spectrally-normalized margin bounds for neural networks," Presented at 31st Conference on Neural Information Processing Systems (NIPS 2017), Long Beach, CA, USA, Dec. 4-9, 2017, 10 pages.

Bartlett, "The sample complexity of pattern classification with neural networks: the size of the weights is more important than the size of the network," IEEE Transactions on Information Theory, Mar. 1998, 44(2):525-536.

Bishop, "Training with noise is equivalent to Tikhonov regularization," Neural computation, Jan. 1995, 7(1):108-116.

Chaudhari et al., "Entropy-SGD: Biasing gradient descent into wide valleys," Journal of Statistical Mechanics: Theory and Experiment, Dec. 20, 2019, 2019(12):124018, 25 pages.

Cohen et al., "DNN or k-NN: That is the generalize vs. memorize question," arXiv, Dec. 19, 2018, 10 pages.

Frankle et al., "The early phase of neural network training," Presented at Eighth International Conference on Learning Representations, Addis Ababa, Ethiopia, Apr. 26-May 1, 2020, 20 pages.

Glorot et al., "Understanding the difficulty of training deep feedforward neural networks," Proceedings of the Thirteenth International Conference on Artificial Intelligence and Statistics, May 2010, 9:249-256.

He et al., "Delving deep into rectifiers: Surpassing human-level performance on imagenet classification," Proceedings of the IEEE International Conference on Computer Vision (ICCV), Dec. 2015, pp. 1026-1034.

He et al., "Identity mappings in deep residual networks," Presented at 14th European Conference on Computer Vision, Amsterdam, The Netherlands, Oct. 11-14, 2016, pp. 630-645.

Howard et al., "Mobilenets: Efficient convolutional neural networks for mobile vision applications," arXiv, Apr. 17, 2017, 9 pages.

Ioffe et al., "Batch normalization: Accelerating deep network training by reducing internal covariate shift," Proceedings of the 32nd International Conference on Machine Learning, Jul. 2015, 9 pages.

Kolesnikov et al., Big transfer (BiT): General visual representation learning, European Conference on Computer Vision, Oct. 2020, 17 pages.

Krizhevsky, "Learning multiple layers of features from tiny images," Apr. 8, 2009, 60 pages.

LeCun et al., "Efficient backprop," Neural networks: Tricks of the trade, 2012, 40 pages.

Maennel et al., "What do neural networks learn when trained with random labels?," Presented at 34th Conference on Neural Information Processing Systems (NeurIPS 2020), Vancouver, Canada, Dec. 6-12, 2020, 12 pages.

Nair et al., "Rectified linear units improve restricted boltzmann machines," Presented at 27th International Conference on Machine Learning (ICML 2010), Haifa, Israel, Jun. 21-24, 2010, 8 pages.

Neyshabur et al., "Exploring generalization in deep learning," Presented at 31st Conference on Neural Information Processing Systems (NIPS 2017), Long Beach, CA, USA, Dec. 4-9, 2017, 10 pages.

Neyshabur et al., "Norm-based capacity control in neural networks," Proceedings of The 28th Conference on Learning Theory, 2015, 40:1-26.

Neyshabur et al., "What is being transferred in transfer learning?," Presented at 34th Conference on Neural Information Processing Systems (NeurIPS 2020), Vancouver, Canada, Dec. 6-12, 2020, 12 pages.

Pedregosa et al., "Scikit-learn: Machine learning in Python," Journal of Machine Learning Research, Oct. 2011, 12:2825-2830.

Raghu et al., "Transfusion: Understanding transfer learning for medical imaging," Presented at 33rd Conference on Neural Information Processing Systems (NeurIPS 2019), Vancouver, Canada, Dec. 8-14, 2019, 11 pages.

Schapire et al., "Boosting the margin: A new explanation for the effectiveness of voting methods," The Annals of Statistics, Oct. 1998, 26(5):1651-1686.

Simonyan et al., "Very deep convolutional networks for large-scale image recognition," arXiv, Apr. 10, 2015, 14 pages.

Xiao et al., "Fashion-MNIST: a novel image dataset for benchmarking machine learning algorithms," arXiv, Sep. 15, 2017, 6 pages.

Yosinski et al., "How transferable are features in deep neural networks?," Advances in Neural Information Processing Systems 27, 2014, 9 pages.

Zagoruyko et al., "Wide residual networks," Presented at 27th British Machine Vision Conference (BMVC), York, UK, Sep. 19-22, 2016, 12 pages.

Zhang et al., "Understanding deep learning requires rethinking generalization," Presented at 5th International Conference on Learning Representations, Toulon, France, Apr. 24-26, 2017, 15 pages.

* cited by examiner

200

Identify current values of the weights          202

Select layer block          204

Generate new values for the weights of the neural network based on which layer block was selected          206

Train the neural network on training data starting from the new values for the weights          208

TRAINING NEURAL NETWORKS WITH REINITIALIZATION

CROSS-REFERENCE TO RELATED APPLICATION

This application claims priority to U.S. Provisional Application No. 63/146,387, filed on Feb. 5, 2021. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a neural network to perform a machine learning task, i.e., to process network inputs to generate network outputs for the machine learning task. More specifically, the system trains the neural network using re-initialization by, at each training time step in a sequence of training time steps during the training, selecting some of the layers in the neural network and re-initializing the values of the weights of the selected layers.

Particular embodiments of the subject matter described in this specification can be implemented so as to realize one or more of the following advantages.

This specification describes techniques for training a neural network to have improved generalization to inputs that do not appear in the training data relative to conventional techniques. In particular, by repeatedly re-initializing the values of the weights of "higher" layers in the neural network during training, the system can train the neural network to have improved generalization without requiring any additional training data and without sacrificing performance on the inputs in the training data. In particular, the described re-initialization techniques result can improve generalization due to any of several factors. As one example, the described techniques can increase the margin on the training examples without increasing the norm of the weights, hence leading to an improvement in known margin-based generalization bounds for neural networks. As another example, the described training techniques cause the training to converge to a local minimum with a better geometric structure than conventional training in terms of sharpness or local entropy as a result of the repeated re-initializations of the weights that occur during the training. As yet another example, the described training techniques encourage learning general rules and discourage memorization of the training inputs by placing more emphasis on the lower layers of the neural network, i.e., because the weights of those layers are not re-initialized as frequently as those of the higher layers. All of these factors result in improved accuracy outside of the training set, i.e., improved generalization, especially when the training set is small and overfitting would otherwise tend to limit how well the learned neural network can generalize.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
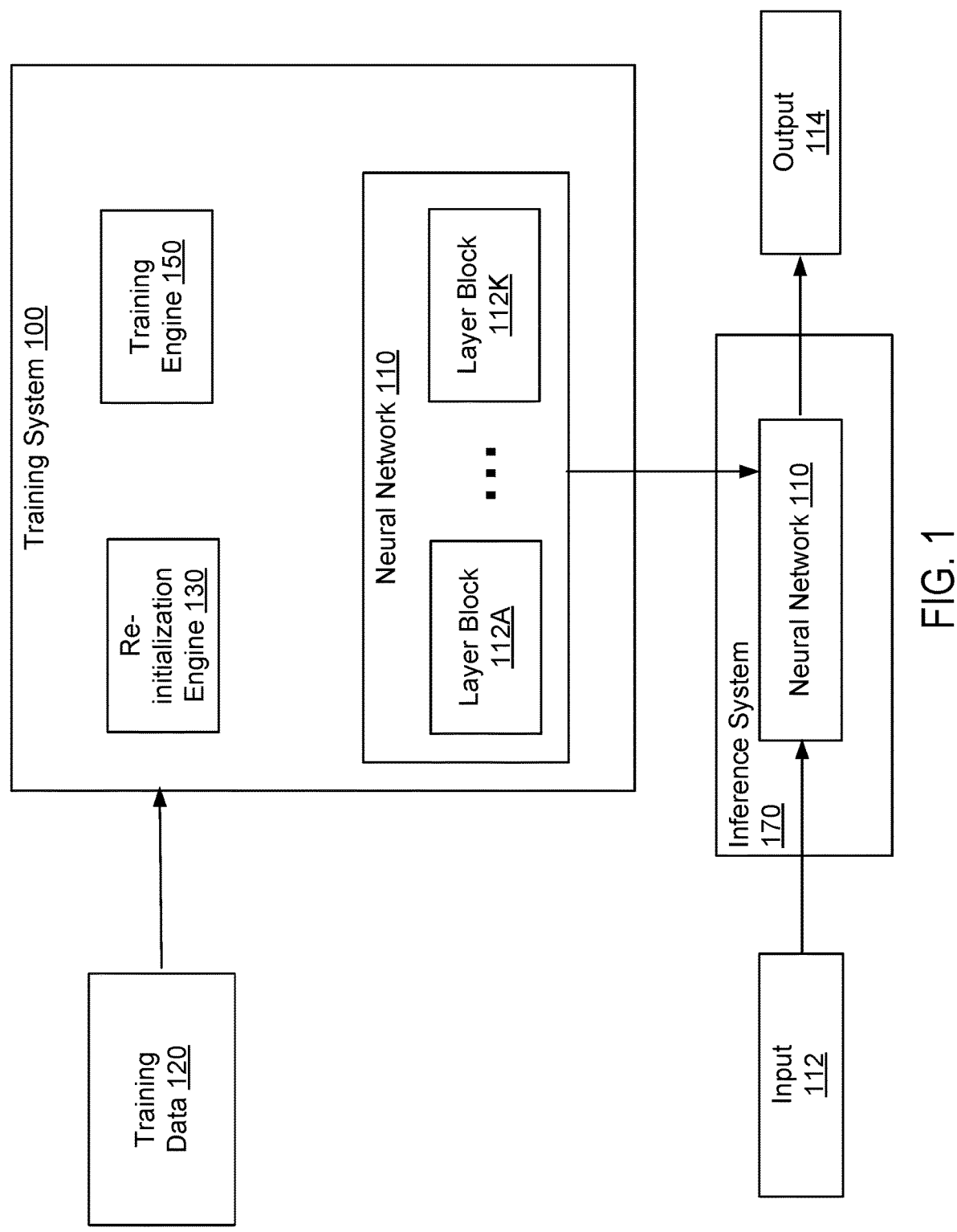
FIG. 1 shows an example training system.

FIG. 1 shows an example training system 100. The training system 100 is an example of a system implemented as computer programs on one or more computers in one or more locations, in which the systems, components, and techniques described below can be implemented.

The training system 100 trains a neural network 110 to perform a machine learning task, i.e., to process network inputs to generate network outputs for the machine learning task.

The neural network can be trained to perform any kind of machine learning task, i.e., can be configured to receive any kind of digital data input and to generate any kind of score, classification, or regression output based on the input.

In some cases, the neural network is a neural network that is configured to perform an image processing task, i.e., receive an input image and to process the input image to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

In particular, the neural network 110 can have any appropriate architecture in which a subset of the neural network layers are arranged into a sequence of layer blocks 112A-K.

For example, the first layer in the first layer block 112A in the sequence of layer blocks can be the first layer in the neural network 110 and there can be one or more layers after the last layer in the last layer block 112K. That is, the neural network 110 can include additional layers that follow the last layer block 112 in the sequence and are not included in any of the layer blocks. A layer block, as used in this specification, refers to a group of one or more neural network layers in a neural network.

As a particular example, the neural network 110 can be a convolutional neural network that includes a set of convolutional layers followed by one or more fully connected layers and followed by an output layer, e.g., a softmax layer for classification tasks.

In this example, the convolutional layers can be partitioned into a sequence of K blocks while the fully connected layers and the softmax layers are not included in any blocks.

An example of this partitioning is described below with reference to FIG. 3.

The system 100 trains the neural network 110 on training data 120 over a sequence of training time steps.

The training data 120 includes a plurality of training examples, with each training example including a training network input and a target output for the training network input. The target output is an output that should be generated by performing the machine learning task on the training network input, i.e., is the ground truth output for the machine learning task for the training network input.

Prior to any of the training time steps, i.e., before training has begun, the system 100 initializes the values of the weights of the layers of the neural network 110, e.g., the values of the kernels any convolutional layers in the neural network, the values of the weight matrices of any fully-connected layers in the neural network, the values of the biases of any layers that have bias vectors, and so on.

The system 100 can perform this initialization using any conventional weight initialization technique that sets each weight to a respective initial value. Examples of such techniques include techniques that assign values randomly, sample the weight values from some distribution, or set all of the weights to a fixed value, e.g., zero.

A training engine 150 within the system 100 then trains the neural network 110 on the training data 120 to determine updated values of the weights of the layers of the neural network 110 from the initial values that were determined by performing initialization. For example, the training engine 150 can train the neural network 110 to convergence or until a fixed number of training steps have been performed.

After this initial round of training and at each training time step in the sequence of training time steps, a re-initialization engine 130 within the system 100 re-initializes the values of the weights, i.e., the current values of the weights as of the training time step, of the layers in one subset of the layers of the neural network 110. Optionally, the re-initialization engine 130 can also re-scale the values of the weights of the layers in another subset of the layers of the neural network 110, add a normalization layer after one or more of the layers in the neural network 110, or both.

Re-initializing weight values refers to setting the weights to initial values that are independent of any training that has already occurred (do not depend on the current values), e.g., by assigning values randomly, sampling the weight values from some distribution, or setting all of the weights to a fixed value, e.g., zero.

Re-scaling the weights refers to adjusting the values so that the weight values have the same scale according to some measure as the weights did after initialization prior to any training of the neural network. For example, the system can scale the current weight values so that the resulting weight values have the same norm as after initialization.

The training engine 150 then trains the neural network 110 starting from the new values for the weights of neural network layers to determine updated values for the weights of the plurality of neural network layers (which are then used as the current values for the next training time step).

The operations performed by the system at a given training step in the sequence are described in more detail below with reference to FIGS. 2 and 3.

By training the neural network over the plurality of training steps, the system 100 trains the neural network 110 to perform better after training, i.e., at inference, than conventional training techniques because the trained neural network 110 will generalize better to new inputs received after training that are outside of the training set.

In particular, after training, the training system 100 or an inference system 170 deploys the trained neural network 110 on one or more computing devices to perform inference, i.e., to generate new network outputs 114 for the machine learning task for new network inputs 112. For example, the inference system 170 can deploy the trained neural network 110 in a data center for processing inputs received from remote users or can provide the trained weight values of the neural network 110 to an edge device, e.g., a mobile phone, a smart personal assistant device, or other IoT device, over a wired or wireless network connection, so that the neural network 110 can be used to perform the machine learning task on the edge device.

Figure 2:
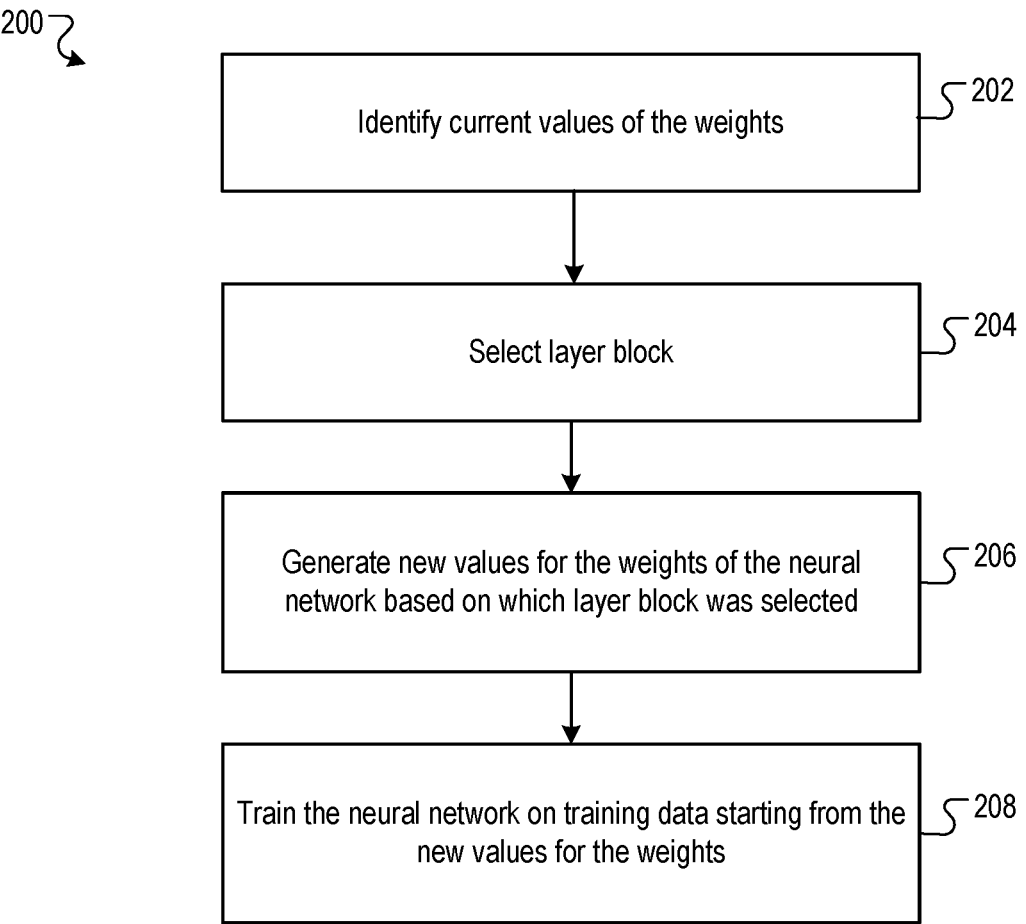
FIG. 2 is a flow diagram of an example process for training the neural network at a given training time step.

FIG. 2 is a flow diagram of an example process 200 for training the neural network at a given training time step. For convenience, the process 200 will be described as being performed by a system of one or more computers located in one or more locations. For example, a training system, e.g., the training system 100 of FIG. 1, appropriately programmed, can perform the process 200.

The system performs the process 200 at each training time step in a sequence of training time steps to iteratively train the neural network. In some implementations, the sequence has a fixed number of training time steps while in other implementations, the system continues adding new training time steps to the sequence until some termination criterion is satisfied, e.g., a threshold number of time steps have been performed or the performance of the neural network on a validation data set exceeds a threshold.

As described above, prior to performing the first training time step in the sequence, the system initializes the values of the weights of the layers of the neural network and performs an initial training round to update the initialized weight values.

The system identifies current values of the weights of the plurality of neural network layers as of the given training time step (step 202). For each training time step after the first training time step in the sequence, the current values are the values after the previous training time step. For the first training time step, the current values are the values after the initial round of training of the neural network that occurs before the first training time step.

The system then selects one of the layer blocks in the sequence of layer blocks into which the subset of the layers of the neural network are arranged (step 204).

Generally, at the first training time step, the system selects a predetermined one of the layer blocks, e.g., the first layer block in the sequence.

After the first training time step, the system determines whether criteria for selecting a new layer block, i.e., a layer block that is different from the one that was selected at the preceding time step, are satisfied. As a particular example, the criteria can be satisfied only when the layer block that was selected at the preceding training time step has already been selected at a threshold number of training time steps. Thus, when the threshold number for a given layer block is greater than one, the system selects the given layer block at multiple consecutive training time steps. In some cases, each layer block has the same threshold number. In some other cases, different layer blocks are associated with different threshold numbers, e.g., with layer blocks that are earlier in the sequence having larger thresholds than layer blocks that are later in the sequence.

When the criteria are not satisfied, the system selects the same layer block as was selected at the preceding training time step.

When the criteria are satisfied, the system selects a new layer block that is one of the layer blocks that is after the previously selected layer block in the sequence. For example, the system can select the layer block that is immediately after the layer block that was selected at the preceding training time step in the sequence in the neural network.

Thus, by selecting the block in this manner, at each training time step, the system selects either a block that is the same as the block that was previously selected or a block that is after the previously selected block in the sequence of blocks, i.e., and not any block that is before the previously selected block in the sequence.

The system generates new values for the weights of the plurality of neural network layers based on which layer block was selected at step 202 (step 206).

In particular, the system re-initializes the values of the weights of at least the neural network layers in the layer blocks that are after the selected layer block in the sequence of layer blocks. That is, the system re-initializes the values of the weights of (i) the neural network layers in the layer blocks that are after the selected layer block in the sequence of layer blocks and, optionally, (ii) any layers in the neural network that are after the last layer block in the sequence. The system does not re-initialize the values of the weights of the layers in the selected layer blocks or any layers that are before the selected layer block in the sequence of layer blocks.

Re-initializing weight values refers to setting the weights to initial values that are independent of any training that has already occurred (do not depend on the current values), e.g., by assigning values randomly, sampling the weight values from some distribution, or setting all of the weights to a fixed value, e.g., zero.

Optionally, the system also rescales the current values of the weights of (i) the neural network layers in the layer block and (ii) the neural network layers in any layer block that is before the selected layer block in the sequence.

Re-scaling the weights refers to adjusting the values so that the weight values have the same scale according to some measure as the weights did after initialization prior to any training of the neural network. For example, the system can scale the current weight values so that the resulting weight values have the same norm as after initialization by multiplying each weight value by a normalization factor. In particular, for each weight tensor of a given neural network layer, e.g., each weight matrix, each kernel, or each bias vector of the given layer, the system can compute an (i) initial norm that is equal to the norm of the values of the weights within the weight tensor after initialization and (ii) a current norm that is equal to the norm of the current values of the weights within the weight tensor. The system can then re-scale the current values of the weights within the weight tensor by multiplying each current weight value within the weight tensor by a normalization factor that is equal to the initial norm divided by the current norm. This results in the resulting weight values having the same norm as after initialization. Re-scaling the weights can improve the performance of the trained neural network by improving the stability of the training, i.e., by preventing the norms of the weights from continuing to grow throughout training as weights of higher layers are re-initialized.

Further optionally, the system can determine whether the selected layer block has previously been selected at any earlier training time step in the sequence. If the selected layer block has not previously been selected, the system inserts a normalization layer into the neural network immediately after the selected layer block, i.e., inserts a normalization layer that receives, as input, the block output generated by the selected layer block. Inserting the normalization layer into the neural network can improve the performance of the trained neural network by providing the layer after the normalization layer inputs in a standardized representation that allows learning to proceed effectively.

Generally, the normalization layer normalizes inputs to the normalization layer without applying any learned parameters that are adjusted during the training of the neural network.

That is, the normalization layer does not have any learned weights and normalizes the layer input using only statistics that are computed during the training. For example, for a given value in the output of a given block, the normalization layer can normalize the value by subtracting a mean statistic from the value and then dividing the resulting difference by a standard deviation statistic. In particular, in some implementations, the mean statistic and the standard deviation statistic are computed as the mean and standard deviation, respectively, of the values in the outputs generated by the given block during the preceding training time step.

If the selected layer has been previously selected, the system does not insert the normalization, i.e., because a normalization has already been inserted the preceding time that the selected block was selected. Instead, the system updates the normalization statistics that are used by the normalization layer to normalize the outputs of the selected block.

In some cases, rather than inserting a normalization layer with no learned parameters, the system instead inserts a normalization layer that applies a learned normalization to the outputs of the selected block. For example, for a given value in the output of a given block, the normalization layer can normalize the value by subtracting a learned mean parameter from the value.

The system then trains the neural network starting from the new values for the weights of the plurality of neural network layers to determine updated values for the weights of the plurality of neural network layers (which are then used as the current values for the next training time step) (step 208). Generally, the system trains the neural network on the same training data for all of the time steps. For example, the system can train the neural network until convergence or for a fixed number of training steps, e.g., until each training example in the training data has been trained on at least a threshold number of times.

By repeatedly training the neural network on the same training data, but with different layers re-initialized, the system can improve the quality of the trained neural network and allow the neural network to better generalize to new inputs after training. In particular, the described re-initialization scheme ensures that higher layers are re-initialized much more frequently than lower layers, which encourages learning general rules and discourages memorization of the training inputs by placing more emphasis on the lower layers of the neural network.

Figure 3:
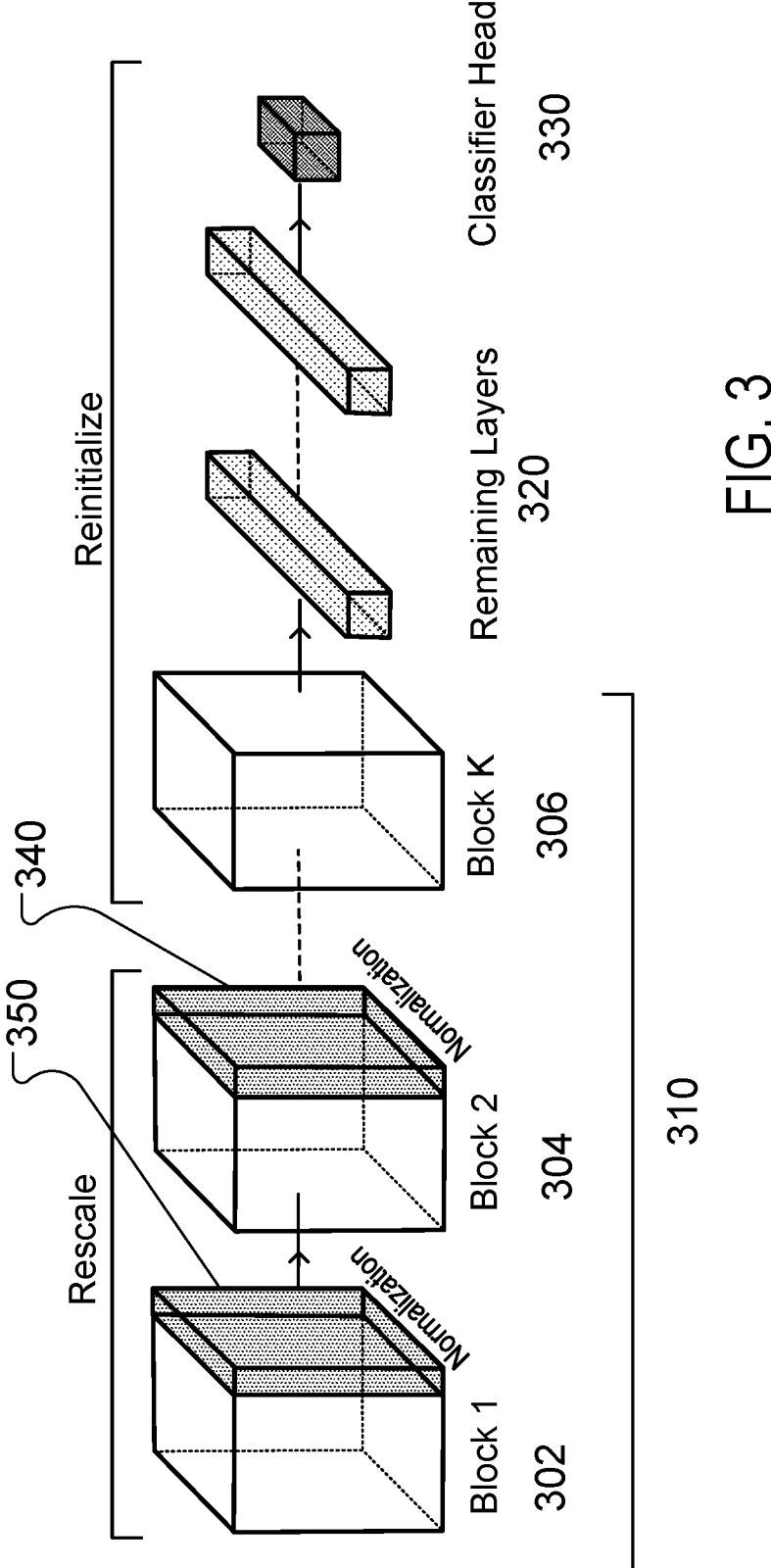
FIG. 3 shows the processing performed at a given training time step for a convolutional neural network.

FIG. 3 shows the processing performed at a given training time step for a convolutional neural network 300.

The convolutional neural network 300 is an example of a convolutional neural network that can be used for a computer vision task and includes a set of convolutional layers 310 followed by a set of remaining layers 320, e.g., fully-connected layers, and then a classifier head 330 that includes one or more neural network layers that generate an output that is appropriate for the computer vision task. The set of convolutional layers can include other layers, e.g., batch normalization layers, pooling layers, and so on, interspersed among the convolutional layers.

In the example of FIG. 3, the set of convolutional layers 310 are partitioned into a sequence of K layer blocks that includes block 1 302, block 2 304, and block K 306. For example, the blocks can each be convolutional blocks that include one or more convolutional layers with layer normalization and ReLU activation, e.g., as in the VCG16 architecture, or depthwise separable convolutional blocks that include depthwise and pointwise layers followed by layer normalization and ReLU activation, e.g., as in the MobileNet architecture.

As another example, the blocks can each be residual blocks that include a convolutional layer and a skip connection, e.g., ResNet blocks.

Moreover, in the example of FIG. 3, at the given time step block 2 304 has been selected as the block for the given training time step.

Accordingly, the system proceeds to reinitialize the weight values for the layers in block K 306, the remaining layers 320, and the classifier head 330.

The system also rescales the weight values of block 1 302 and block 2 304.

Additionally, the system inserts a normalization layer 340 after the block 2 304. Because block 1 302 has previously been selected, the system has previously inserted a normalization layer 350 after block 1 302.

After re-initialization, rescaling, and inserting the normalization layer 350 are complete, the system trains the entire neural network 300, e.g., until convergence, on the same training data that was used at preceding training time steps.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

training a neural network comprising a plurality of neural network layers each having a respective plurality of weights, wherein at least a subset of the neural network layers are arranged into a sequence of layer blocks, and wherein the training comprises re-initializing weights of one or more of the layer blocks at each of a sequence of training time steps to improve generalization of the neural network to new inputs after training, comprising:

at each training time step in the sequence of a plurality of training time steps:

identifying current values of the weights of the plurality of neural network layers as of the training time step;

selecting one of the layer blocks;

determining whether the selected layer block has previously been selected at any earlier training time step in the sequence;

in response to determining that the selected layer block has not previously been selected, inserting a normalization layer into the neural network immediately after the selected layer block;

generating new values for the weights of the plurality of neural network layers, comprising:

re-initializing the values of the weights of at least the neural network layers in the layer blocks that are after the selected layer block in the sequence without re-initializing the current values of the weights of the neural network layers in the selected layer block and the neural network layers in any layer block that is before the selected layer block in the sequence; and training the neural network starting from the new values for the weights of the plurality of neural network layers to determine updated values for the weights of the plurality of neural network layers.

2. The method of claim 1, wherein the normalization layer normalizes inputs to the normalization layer without applying any learned parameters that are adjusted during the training of the neural network.

3. The method of claim 1, further comprising, in response to determining that the selected layer block has previously been selected, updating the normalization statistics used by the normalization layer to normalize the outputs of the selected block.

4. The method of claim 1, wherein selecting one of the layer blocks comprises:

determining whether criteria for selecting a new layer block are satisfied; and when the criteria are not satisfied, selecting the same layer block as was selected at the preceding training time step.

5. The method of claim 4, wherein the criteria are satisfied only when the layer block that was selected at the preceding training time step has already been selected at a threshold number of training time steps.

6. The method of claim 1, wherein selecting one of the layer blocks comprises:

determining whether criteria for selecting a new layer block are satisfied; and when the criteria are satisfied, selecting the layer block that is immediately after the layer block that was selected at the preceding training time step in the sequence in the neural network.

7. The method of claim 1, wherein the neural network comprises one or more neural network layers that are after the last layer block in the sequence and wherein generating new values for the weights of the plurality of neural network layers comprises:

re-initializing the values of the weights of at least the neural network layers that are after the last layer block in the sequence.

8. The method of claim 1, further comprising, prior to the first training time step:

initializing the values of the weights of the neural networks layers in the neural network; and training the neural network to generate the current values of the weights of the neural network for the first training time step.

9. The method of claim 1, wherein the neural network is trained on the same training data at all of the training time steps.

10. The method of claim 1, wherein training the neural network comprises training the neural network to convergence.

11. The method of claim 1, wherein generating new values comprises:

rescaling the current values of the weights of the neural network layers in the layer block and the neural network layers in any layer block that is before the selected layer block in the sequence.

12. One or more non-transitory computer-readable media storing instructions that when executed by one or more computers cause the one or more computers to perform operations comprising:

training a neural network comprising a plurality of neural network layers each having a respective plurality of weights, wherein at least a subset of the neural network layers are arranged into a sequence of layer blocks, and wherein the training comprises re-initializing weights of one or more of the layer blocks at each of a sequence of training time steps to improve generalization of the neural network to new inputs after training, comprising:

at each training time step in the sequence of a plurality of training time steps:

identifying current values of the weights of the plurality of neural network layers as of the training time step;

selecting one of the layer blocks;

determining whether the selected layer block has previously been selected at any earlier training time step in the sequence;

in response to determining that the selected layer block has not previously been selected, inserting a normalization layer into the neural network immediately after the selected layer block;

generating new values for the weights of the plurality of neural network layers, comprising:

re-initializing the values of the weights of at least the neural network layers in the layer blocks that are after the selected layer block in the sequence without re-initializing the current values of the weights of the neural network layers in the selected layer block and the neural network layers in any layer block that is before the selected layer block in the sequence; and training the neural network starting from the new values for the weights of the plurality of neural network layers to determine updated values for the weights of the plurality of neural network layers.

13. A system comprising one or more computers and one or more storage devices storing instructions that when executed by the one or more computers cause the one or more computers to perform operations comprising:

training a neural network comprising a plurality of neural network layers each having a respective plurality of weights, wherein at least a subset of the neural network layers are arranged into a sequence of layer blocks, and wherein the training comprises re-initializing weights of one or more of the layer blocks at each of a sequence of training time steps to improve generalization of the neural network to new inputs after training, comprising:

at each training time step in the sequence of a plurality of training time steps:

identifying current values of the weights of the plurality of neural network layers as of the training time step;

selecting one of the layer blocks;

determining whether the selected layer block has previously been selected at any earlier training time step in the sequence;

in response to determining that the selected layer block has not previously been selected, inserting a normalization layer into the neural network immediately after the selected layer block;

generating new values for the weights of the plurality of neural network layers, comprising:

re-initializing the values of the weights of at least the neural network layers in the layer blocks that are after the selected layer block in the sequence without re-initializing the current values of the weights of the neural network layers in the selected layer block and the neural network layers in any layer block that is before the selected layer block in the sequence; and training the neural network starting from the new values for the weights of the plurality of neural network layers to determine updated values for the weights of the plurality of neural network layers.

14. The system of claim 13, wherein the normalization layer normalizes inputs to the normalization layer without applying any learned parameters that are adjusted during the training of the neural network.

15. The system of claim 13, the operations further comprising, in response to determining that the selected layer block has previously been selected, updating the normalization statistics used by the normalization layer to normalize the outputs of the selected block.

16. The system of claim 13, wherein selecting one of the layer blocks comprises:

determining whether criteria for selecting a new layer block are satisfied; and when the criteria are not satisfied, selecting the same layer block as was selected at the preceding training time step.

17. The system of claim 13, wherein selecting one of the layer blocks comprises:

determining whether criteria for selecting a new layer block are satisfied; and when the criteria are satisfied, selecting the layer block that is immediately after the layer block that was selected at the preceding training time step in the sequence in the neural network.

18. The system of claim 17, wherein the criteria are satisfied only when the layer block that was selected at the preceding training time step has already been selected at a threshold number of training time steps.

\* \* \* \* \*